(12) United States Patent
Morgan et al.

(10) Patent No.: US 7,239,491 B1
(45) Date of Patent: *Jul. 3, 2007

(54) PROTECTIVE DEVICE WITH MISWIRE PROTECTION

(75) Inventors: Kent Morgan, Groton, NY (US); Richard Weeks, Little York, NY (US); Patrick J. Murphy, Marcellus, NY (US); Gerald R. Savicki, Jr., Canastota, NY (US); David A. Finlay, Sr., Marietta, NY (US)

(73) Assignee: Pass & Seymore, Inc., Syracuse, NY (US)

( * ) Notice: Subject to any disclaimer, the term of this patent is extended or adjusted under 35 U.S.C. 154(b) by 330 days.

This patent is subject to a terminal disclaimer.

(21) Appl. No.: 10/964,217

(22) Filed: Oct. 13, 2004

Related U.S. Application Data

(63) Continuation-in-part of application No. 10/884,304, filed on Jul. 2, 2004, now Pat. No. 7,133,266.

(51) Int. Cl.
*H02H 3/16* (2006.01)
(52) U.S. Cl. ........................................... 361/42
(58) Field of Classification Search .................. 361/42
See application file for complete search history.

(56) References Cited

U.S. PATENT DOCUMENTS

| | | | |
|---|---|---|---|
| 4,477,857 A | 10/1984 | Crocker | |
| 5,363,083 A | 11/1994 | Fischer | |
| 5,841,615 A * | 11/1998 | Gershen | 361/42 |
| 5,923,239 A | 7/1999 | Krueger et al. | |
| 6,043,966 A | 3/2000 | Krueger et al. | |
| 6,317,307 B1 | 11/2001 | Bone et al. | |
| 6,437,953 B2 * | 8/2002 | DiSalvo et al. | 361/42 |
| 6,492,894 B2 | 12/2002 | Bone et al. | |
| 6,522,510 B1 * | 2/2003 | Finlay et al. | 361/42 |
| 6,721,156 B2 | 4/2004 | Masghati | |
| 6,724,590 B1 * | 4/2004 | Radosavljevic et al. | 361/42 |
| 6,867,954 B2 * | 3/2005 | Wu et al. | 361/42 |
| 2003/0048620 A1 | 3/2003 | Nishimura et al. | |

* cited by examiner

Primary Examiner—Stephen W. Jackson
Assistant Examiner—Boris Benenson
(74) Attorney, Agent, or Firm—Daniel P. Malloy; Bond, Schoeneck & King PLLC

(57) ABSTRACT

The present invention is directed to an electrical wiring protection device that includes a housing assembly including a plurality of line terminals and a plurality of load terminals. A miswire detection circuit is coupled to at least one of the plurality of line terminals, the miswire detection circuit being configured to generate a miswire detection signal when AC power is coupled to the plurality of load terminals. The miswire detection circuit includes a circuit element configured to open circuit after a predetermined period of time elapses when AC power is coupled to the hot line terminal and neutral line terminal. A fault detection circuit is coupled to at least one of the plurality of line terminals and configured to generate a fault detection signal in response to detecting at least one fault condition and/or the miswire detection signal. An interrupting contact assembly is coupled between the plurality of line terminals and the plurality of load terminals. The interrupting contact assembly includes interrupting contacts that provide electrical continuity between the plurality of line terminals and the plurality of load terminals in a reset condition. The interrupting contact assembly also is configured to open the interrupting contacts in a tripped condition, in response to the fault detection signal and/or the miswire detection signal. A surge protection circuit is coupled to the miswire detection circuit. The surge protection circuit is configured to prevent a current from traversing the open circuit.

60 Claims, 6 Drawing Sheets

PROTECTIVE DEVICE WITH MISWIRE PROTECTION

CROSS-REFERENCE TO RELATED APPLICATIONS

This is a continuation-in-part of U.S. patent application Ser. No. 10/884,304 filed on Jul. 2, 2004, now U.S. Pat. No. 7,133,266 the content of which is relied upon and incorporated herein by reference in its entirety, and the benefit of priority under 35 U.S.C. §120 is hereby claimed.

BACKGROUND OF THE INVENTION

1. Field of the Invention

The present invention relates generally to electrical wiring devices, and particularly to devices that have miswiring protection.

2. Technical Background

Electrical distribution systems that provide power to a house, building or some other facility include one or more breaker panels coupled to a source of AC power. Of course, the breaker panel distributes AC power to one or more branch electric circuits installed in the structure. The electric circuits may typically include one or more receptacle outlets and may further transmit AC power to one or more electrically powered devices, commonly referred to in the art as load circuits. The receptacle outlets provide power to user-accessible loads that include a power cord and plug, the plug being insertable into the receptacle outlet. However, certain types of faults have been known to occur in electrical wiring systems. Accordingly, each electric circuit typically employs one or more electric circuit protection devices.

Both receptacle wiring devices and electric circuit protective wiring devices are disposed in an electrically non-conductive housing. The housing includes electrical terminals that are electrically insulated from each other. Line terminals couple the wiring device to wiring that provides AC electrical power from the breaker panel. Load terminals are coupled to wiring that directs AC power to one or more electrical loads. Those of ordinary skill in the pertinent art will understand that the term "load" refers to an appliance, a switch, or some other electrically powered device. Load terminals may also be referred to as "feed-through" terminals because the wires connected to these terminals may be coupled to a daisy-chained configuration of receptacles or switches. The load may ultimately be connected at the far end of this arrangement. Referring back to the device housing, the load terminals may be connected to an electrically conductive path that is also connected to a set of receptacle contacts. The receptacle contacts are in communication with receptacle openings disposed on the face of the housing. This arrangement allows a user to insert an appliance plug into the receptacle opening to thereby energize the device.

As noted above, there are several types of electric circuit protection devices. For example, such devices include ground fault circuit interrupters (GFCIs), ground-fault equipment protectors (GFEPs), and arc fault circuit interrupters (AFCIs). This list includes representative examples and is not meant to be exhaustive. Some devices include both GFCIs and AFCIs. As their names suggest, arc fault circuit interrupters (AFCIs), ground-fault equipment protectors (GFEPs) and ground fault circuit interrupters (GFCIs) perform different functions. An arc fault typically manifests itself as a high frequency current signal. Accordingly, an AFCI may be configured to detect various high frequency signals and de-energize the electrical circuit in response thereto. A ground fault occurs when a current carrying (hot) conductor creates an unintended current path to ground. A differential current is created between the hot/neutral conductors because some of the current flowing in the circuit is diverted into the unintended current path. The unintended current path represents an electrical shock hazard. Ground faults, as well as arc faults, may also result in fire.

A "grounded neutral" is another type of ground fault. This type of fault may occur when the load neutral terminal, or a conductor connected to the load neutral terminal, becomes grounded. While this condition does not represent an immediate shock hazard, it may lead to serious hazard. As noted above, a GFCI will trip under normal conditions when the differential current is greater than or equal to approximately 6 mA. However, when the load neutral conductor is grounded the GFCI becomes de-sensitized because some of the return path current is diverted to ground. When this happens, it may take up to 30 mA of differential current before the GFCI trips. Therefore, if a double-fault condition occurs, i.e., if the user comes into contact with a hot conductor (the first fault) when simultaneously contacting a neutral conductor that has been grounded on the load side (the second fault), the user may experience serious injury or death.

One problem that is associated with protective devices relates to the protective device being miswired in the field by an installer. In particular, the installer connects the line terminals to the load side of the electric circuit, and connects the load terminals to the AC power source. Miswiring may result in the protective device not protecting the user from the fault conditions described above. Labels and installation instruction sheets have been used to prevent miswiring. However, instructive material may be ignored by an installer.

Another problem is that protective device, like all electrical devices, have a limited life expectancy. When the device has reached end of life, the user may not be protected from the fault condition. End of life failure modes include failure of device circuitry, the relay solenoid that opens the GFCI interrupting contacts, and/or the solenoid driving device, such as a silicon controlled rectifier. An end of life failure mode can result in the protective device not protecting the user from the faults referred to above. Test buttons have been incorporated into protective devices to provide the user with a means for testing the effectiveness of the device. One drawback to this approach lies in the fact that if the user fails to use the test button, the user will not know if the device is functional. Even if the test is performed, the test results may be ignored by the user for various reasons.

What is needed is a protective device configured to reliably protect the user from a fault condition in the electrical power distribution system. A protective device must be configured to detect, and indicate, that a miswire condition is extant. A protective device is further needed that denies power to the portion of the electrical power distribution system experiencing the fault condition. Further, a protective device is needed that is equipped to decouple the load terminals from the line terminals in the event of an end of life condition.

SUMMARY OF THE INVENTION

The present invention provides a protective device configured that reliably protects the user from a fault condition in the electrical power distribution system. The present invention denies power to the portion of the electrical power distribution system experiencing the fault condition. Further, the protective device of the present invention is equipped to decouple the load terminals from the line terminals in the event of an end of life condition.

One aspect of the present invention is directed to an electrical wiring protection device that includes a housing assembly including a plurality of line terminals and a plurality of load terminals. A miswire detection circuit is coupled to at least one of the plurality of line terminals, the miswire detection circuit being configured to generate a miswire detection signal when AC power is coupled to the plurality of load terminals. The miswire detection circuit includes a circuit element configured to open circuit after a predetermined period of time elapses when AC power is coupled to the hot line terminal and neutral line terminal. A fault detection circuit is coupled to at least one of the plurality of line terminals and configured to generate a fault detection signal in response to detecting at least one fault condition and/or the miswire detection signal. An interrupting contact assembly is coupled between the plurality of line terminals and the plurality of load terminals. The interrupting contact assembly includes interrupting contacts that provide electrical continuity between the plurality of line terminals and the plurality of load terminals in a reset condition. The interrupting contact assembly also is configured to open the interrupting contacts in a tripped condition, in response to the fault detection signal and/or the miswire detection signal. A surge protection circuit is coupled to the miswire detection circuit. The surge protection circuit is configured to prevent a current from traversing the open circuit.

In another aspect, the present invention includes a method for protecting against miswiring a protection device. The protection device includes a plurality of line terminals and a plurality of load terminals. The protection device also includes interrupting contacts that provide electrical continuity between the plurality of line terminals and the plurality of load terminals in a reset state and decouple the plurality of line terminals from the plurality of load terminals in a tripped state. The method includes the step of resetting the interrupting contacts when the device is improperly connected to a source of AC power. The interrupting contacts are immediately tripped in response to being improperly connected to the source of AC power. The preceding steps are repeated until the device is properly connected to a source of AC power.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
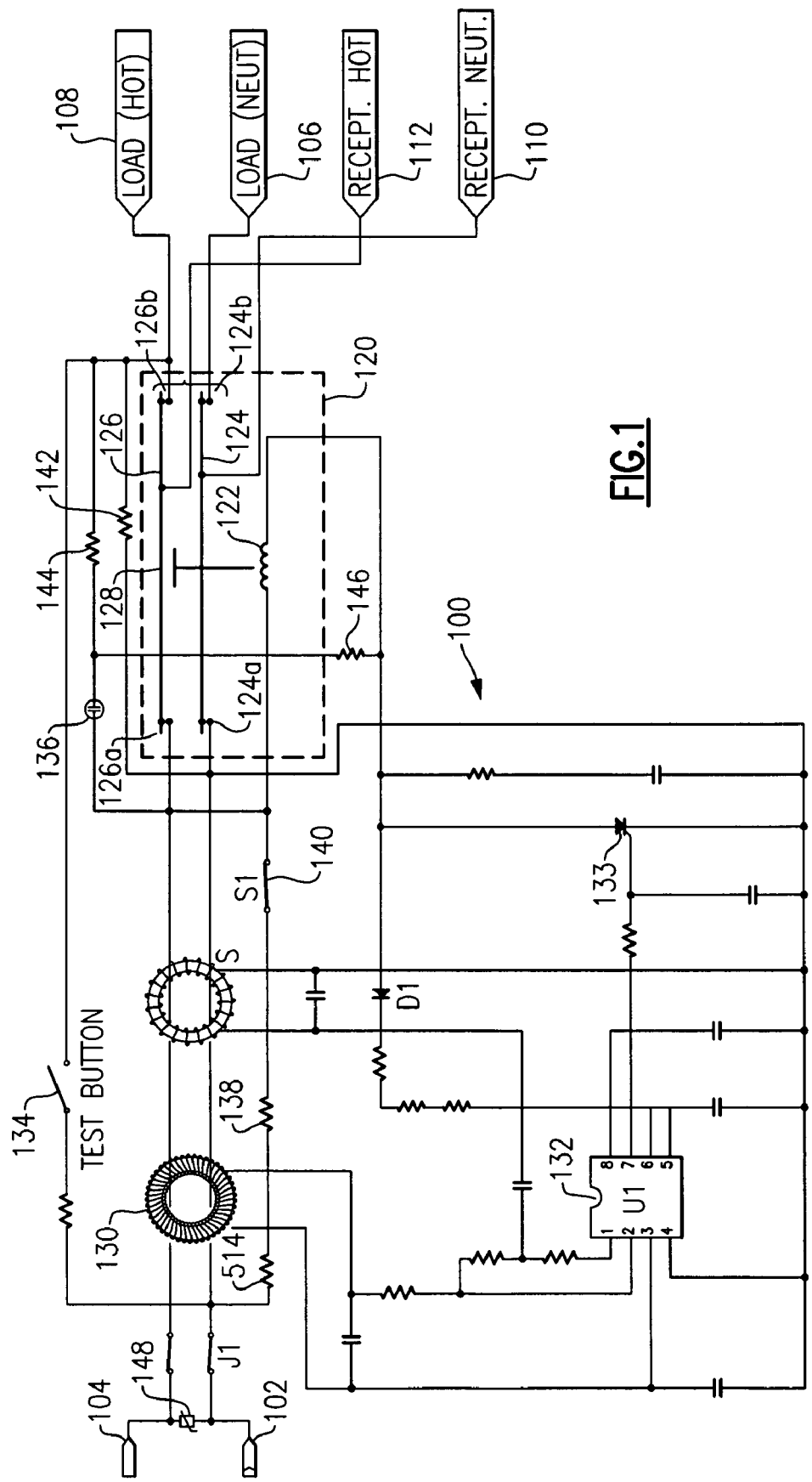
FIG. 1 is a schematic of a protective device in accordance with one embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the protection device of the present invention is shown in FIG. 1, and is designated generally throughout by reference numeral 10.

As embodied herein and depicted in FIG. 1, a schematic of a protective device in accordance with one embodiment of the present invention is disclosed. In particular, FIG. 1 provides a schematic diagram of GFCI 10. Device 10 includes a neutral line terminal 102 and a hot line terminal 104. When properly wired, these terminals are connected to electrical distribution system wiring that is coupled to an AC power source of the distribution system. Device 10 also includes neutral downstream terminal 106 and hot downstream terminal 108. When properly wired, the load terminals are connected to branch circuit wiring coupled to one or more electrical loads. Branch circuits often include a number of daisy-chained receptacles or switches. The load terminals also include neutral receptacle terminal 110 and hot receptacle terminal 112. The receptacle terminals, of course, provide appliances equipped with corded plugs access to AC power. Device 10 includes a sensor 130, which in a GFCI, is typically a differential transformer. Sensor 130 is coupled to detector circuit 132. Detector 132 is configured to signal silicon controlled rectifier (SCR) 133 when a fault condition is detected. SCR 133 controls the operation of solenoid 122. Solenoid 122 includes an armature that actuates circuit interrupter 120. Circuit interrupter 120 is configured to electrically decouple the line terminals from the load terminals in response thereto. When differential transformer 130 senses a differential current, i.e., unequal amounts of current flowing in the hot and neutral conductors, due to a ground fault condition, detector 132 signals solenoid driver 133 to trip circuit interrupter 120.

In particular, when solenoid 122 is magnetically actuated, circuit interrupter 120 is configured to displace bus bars 124 and 126 to the tripped (open) position. In the tripped position, air gaps 124a and 126a are introduced. Further, when bus bars 124 and 126 are in the open position, air gaps 124b and 126b decouple the downstream load terminals from the receptacle terminals.

A manual reset button 128 may be coupled to circuit interrupter 120. After the miswire condition has been removed and the reset button 128 is depressed, bus bars 124 and 126 are driven into a reset state, eliminating air gaps 124a, 124b, 126a, and 126b. Of course, the line and load terminals are reconnected when circuit interrupter 120 is reset.

It will be apparent to those of ordinary skill in the pertinent art that modifications and variations can be made to circuit interrupter 120 of the present invention. For example, circuit interrupter 120 may include bus bars, cantilever beams, or any other suitable structure.

In one embodiment, device 10 is periodically tested by a circuit that automatically establishes a periodical simulated fault condition. In another embodiment, device 10 may be tested by operating a manual test button 134. When depressed, test button 134 generates a simulated fault condition. The test result may be displayed by a visual or audible indicator 136. A successful test result may also be indicated by movement of reset button 128. In particular, the test is conducted to determine whether the fault circuitry and the circuit interrupter is responsive to a fault. Accordingly, reset button 128 is configured to move from a reset position to a tripped position in response to a successful test.

In another embodiment, if the device is already in a tripped state and the test is unsuccessful, device 10 prevents circuit interrupter 120 from being reset, and/or being able to maintain a reset condition. In other words, the device will be reset by the user and will immediately trip thereafter.

A miswire circuit is coupled between line terminals 102 and 104. The miswire circuit includes a fault resistance 138 that is designed to generate a difference current in excess of a predetermined fault threshold. The fault threshold typically exceeds the level of differential current that the GFCI has been designed to interrupt, typically 6 milliamperes. The miswire resistance 138 is on the line side of circuit interrupter 120 and electrically coupled to line terminals 102 and 104.

When the GFCI is both tripped and miswired, i.e., when power is supplied to the load terminals, nothing visible happens. Further, no power to the receptacle terminals 110, 112.

If the GFCI is in the reset condition, it will immediately trip when power is applied to the load side. Further, the device trips before miswire resistance 138 opens because the current flowing through the miswire resistance 138 is interrupted when the device trips. The estimated time it takes for the miswire resistance 138 to "clear" or burn out is greater than 50 ms. The trip time of the GFCI is less than or equal to 25 ms. Accordingly, miswire resistance 138 does not have enough time to clear. If one attempts to reset the device when in the miswired condition, the device repeatedly trips out until such time as the device is wired correctly. Thus, GFCI 10 will not operate until the device is properly wired.

As noted above, the receptacle terminals 110,112 are not powered during a miswire condition. Air gaps 124b and 126b prevent the power source connected to the load terminals from providing power to the receptacle terminals when device 10 is miswired. Thus, injury or damage from a fault condition in the user attachable load is precluded by the air gaps. Alternatively, either air gap, 124b or 126b, may be omitted if denial of power to the receptacle outlet serves to motivate the user to correct the miswired condition. Alternatively, both air gaps, 124b or 126b, may be omitted if the repeated tripping action alone is enough to motivate the installer to correct the miswired condition. For a multi-phase distribution system, a plurality of air gaps may be provided in the conductors of a multi-phase distribution system.

When electrical power is connected in a correct manner to the line terminals, a differential current is created by the miswire resistance 138. If the device is reset before power is applied, the device trips as a result of this differential current. If the device is already in the tripped condition before power is applied, nothing visible happens. However, because the miswire resistance is on the line side of the circuit interrupter 120, current through fault resistance 138 continues to flow, regardless of whether the circuit interrupter 120 is in the tripped condition. The current through miswire resistance 138 causes the resistance to clear itself in a short time, typically 50 ms to 5 seconds. This can be accomplished by selecting a resistor or resistors whose power rating is greatly exceeded by the current.

Figure 4:
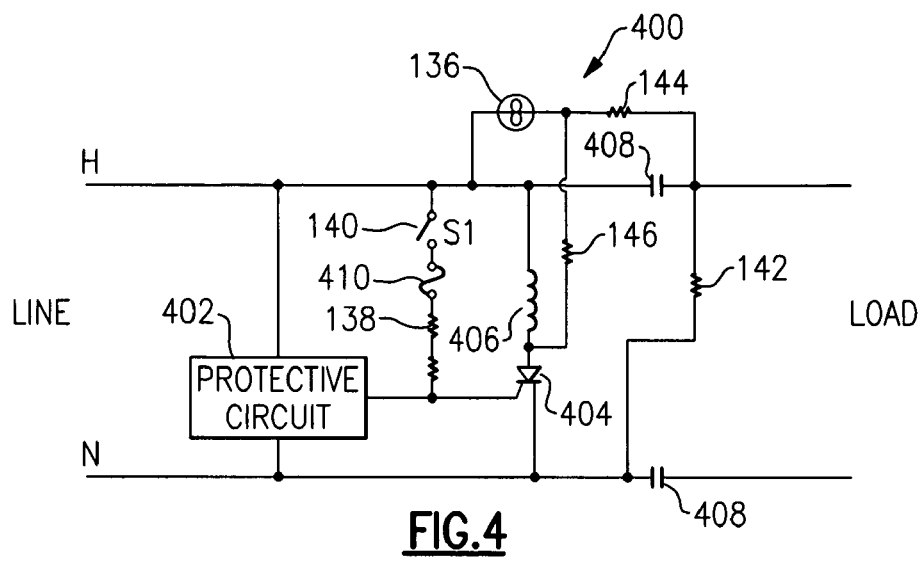
FIG. 4 is a schematic of a protective device in accordance with another embodiment of the present invention.

In alternate embodiment, a fuse is provided in series with the miswire resistance 138 (see FIG. 4). The fuse is characterized by a properly selected $I^2t$ rating such that the fuse blows instead of the miswire resistance 138. Once the device has been properly wired with power connected to the line terminals and the fault has been cleared, device 100 can be reset and provide its normal protective functions.

An interesting issue with respect to miswire protection relates to performing Underwriters Laboratories required tests, such UL-943, during the manufacture of the protective devices. The differential current produced by the miswire resistance 138 must not affect the test results, or cause the miswire resistance to clear in the manner previously described. One solution is to place a normally closed switch 140 in series with the miswire resistance 138.

With regard to the mechanical implementation of switch 140, switch 140 may be implemented using a flexible conductive spring arm that normally rests against a contact on the top side of a printed circuit board. A hole is disposed in the printed circuit board directly below the spring arm of switch 140. An additional hole is disposed below the first hole in the plastic back body of the GFCI device. When GFCI 10 is inserted into the test equipment to perform the aforementioned manufacturing tests, a mechanical test probe engages the spring arm of switch 140 through the two aforementioned holes. The probe causes the spring arm of switch 140 to be pushed away from the contact to open the differential current circuit path. Manufacturing testing may be performed without clearing miswire resistance 138. The last test performed on the GFCI device in the test sequence is to disengage the probe from the spring arm of switch 140. The differential current circuit path is reconnected to check the integrity of the differential current circuit path and other GFCI components. The reconnected path should cause the GFCI device to trip if it is operating properly.

The present invention may include a visual and/or audible indicator. The indicator may have multiple indication meanings. As shown in FIG. 1, the circuit includes resistors 142,144,146, and indicator light 136. Light 136 is a trip indication light. The light is off if GFCI 10 is in the reset condition, and illuminates if the GFCI 10 is tripped. If device 10 is miswired, light 136 is off, regardless of whether the device is reset or tripped. If device 10 is properly wired, allowing a reset condition to be maintained, light 136 is off. If device 10 is properly wired and tripped, light 136 is illuminated. Light 136 may also serve to notify the user that the solenoid-driving device is defective and that device 10 is no longer operational.

The indicating circuit works as follows. When the GFCI is wired properly, and the device is reset, light 136 is off. In this case, the circuit interrupter 120 is closed (reset) and no voltage is present across light 136 and resistor 144. If the GFCI trips for any reason, light 136 is energized by line voltage being applied across light 136 and resistors 144 and 142. When the circuit interrupter 120 is reset, voltage is removed and light 136 turns off. If the device is miswired, light 136 is off when the circuit interrupter 120 is reset. However, when the device trips in this condition, there is no return path to neutral through resistor 142. Accordingly, light 136 does not turn on as it would if the GFCI were wired properly. This feature is not dependent on the miswire resistance 138. Thus, if the miswire detection circuit has been previously used and the miswire resistance cleared, miswire detection is still possible by energizing light 136 in conjunction with tripping the GFCI 10.

Turning now to end-of-life indication, the circuit branch that includes resistor 146 indicates that SCR 133 (i.e., the solenoid driving device) is defective. When SCR 133 short circuits, a current path to supply neutral is established via resistor 146 to thereby energize light 136. Those skilled in the pertinent art will understand that trip solenoid 122 will open within a few seconds when the line voltage is continuously applied as a result of a shorted SCR 133. When coil 122 burns out, device 10 may no longer be tripped after reset. When this occurs, light 136 remains energized, indicating a defective solenoid driving device. The value of resistor 146 must be kept low relative to the value of resistor 144, since the two resistors form a voltage divider that limits the voltage across light 136. If light 136 is a neon lamp, the values of resistors 144 and 146 are chosen to apply about 60 volts. This voltage level allows the lamp to arc and energize. In this embodiment, resistor 146 is typically 33 K. This resistance value results in approximately 66 volts being applied across the neon lamp at a worst case line voltage of 102 VAC. Computing different values for resistors 142, 144, and 146 based on different types of indicators, including a light and/or annunciator 136 is considered within the capabilities of one skilled in the art.

Figure 2:
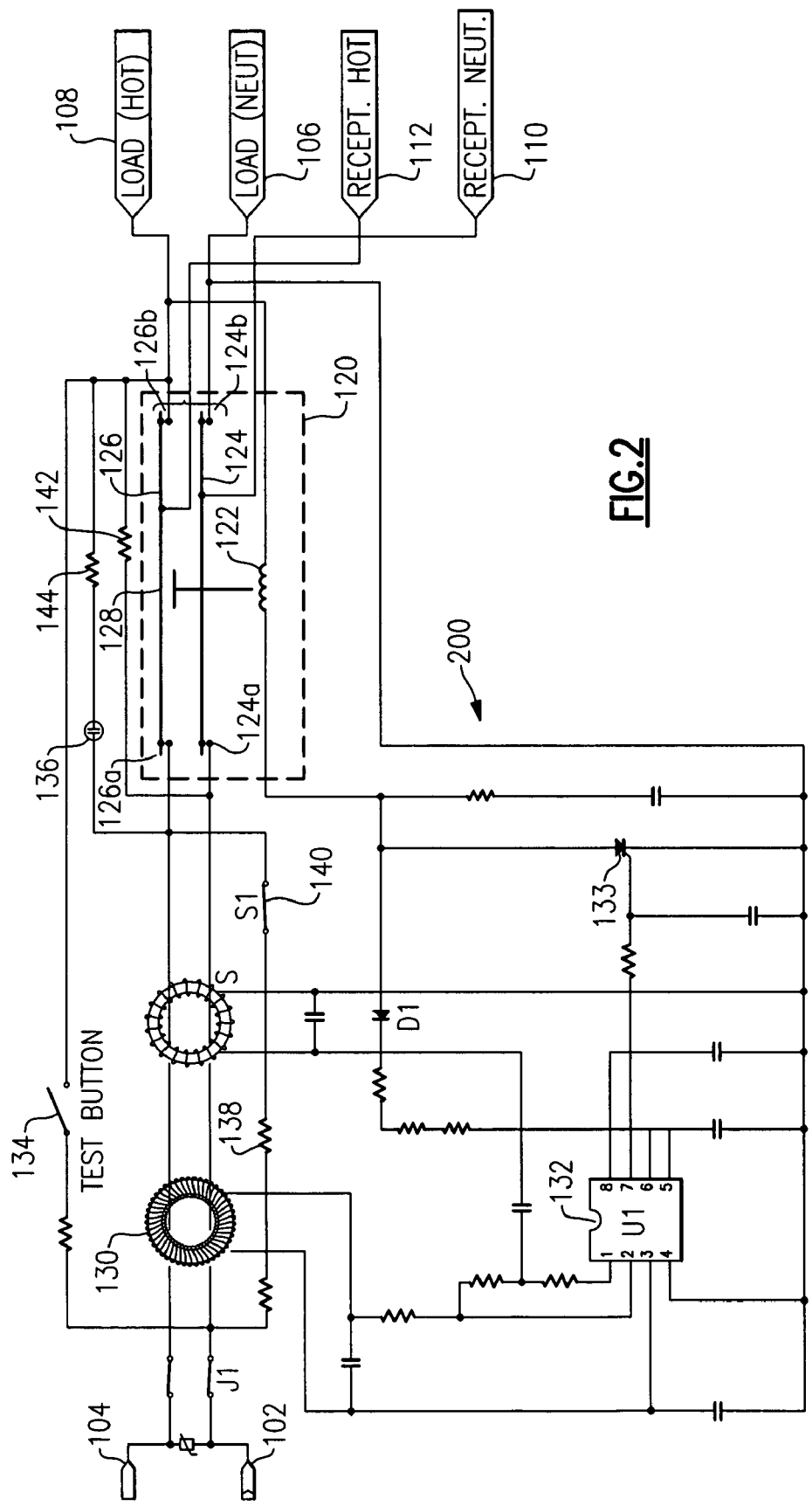
FIG. 2 is a schematic of a protective device in accordance with a second embodiment of the present invention.

As embodied herein and depicted in FIG. 2, a second embodiment of the present invention is shown. GFCI 200 cannot be reset if the SCR shorts out. Accordingly, device 200 includes a lock out mechanism. In this embodiment, breaker coil 122 draws power from the load side of circuit interrupter 120. When SCR 133 shorts out, breaker coil 122 is immediately actuated. Circuit interrupter 120 is tripped, breaking the current path to the load side of the device. As such, breaker coil 122 is de-energized, preventing it from burning out. If the device is reset, breaker coil 122 immediately trips out circuit interrupter 120. Accordingly, the device is prevented from being reset. Note that resistor 146 is not used in this embodiment because there is no need to indicate that the device has a faulty SCR 133. The inability to reset the device signals the end-of-life condition.

Figure 3:
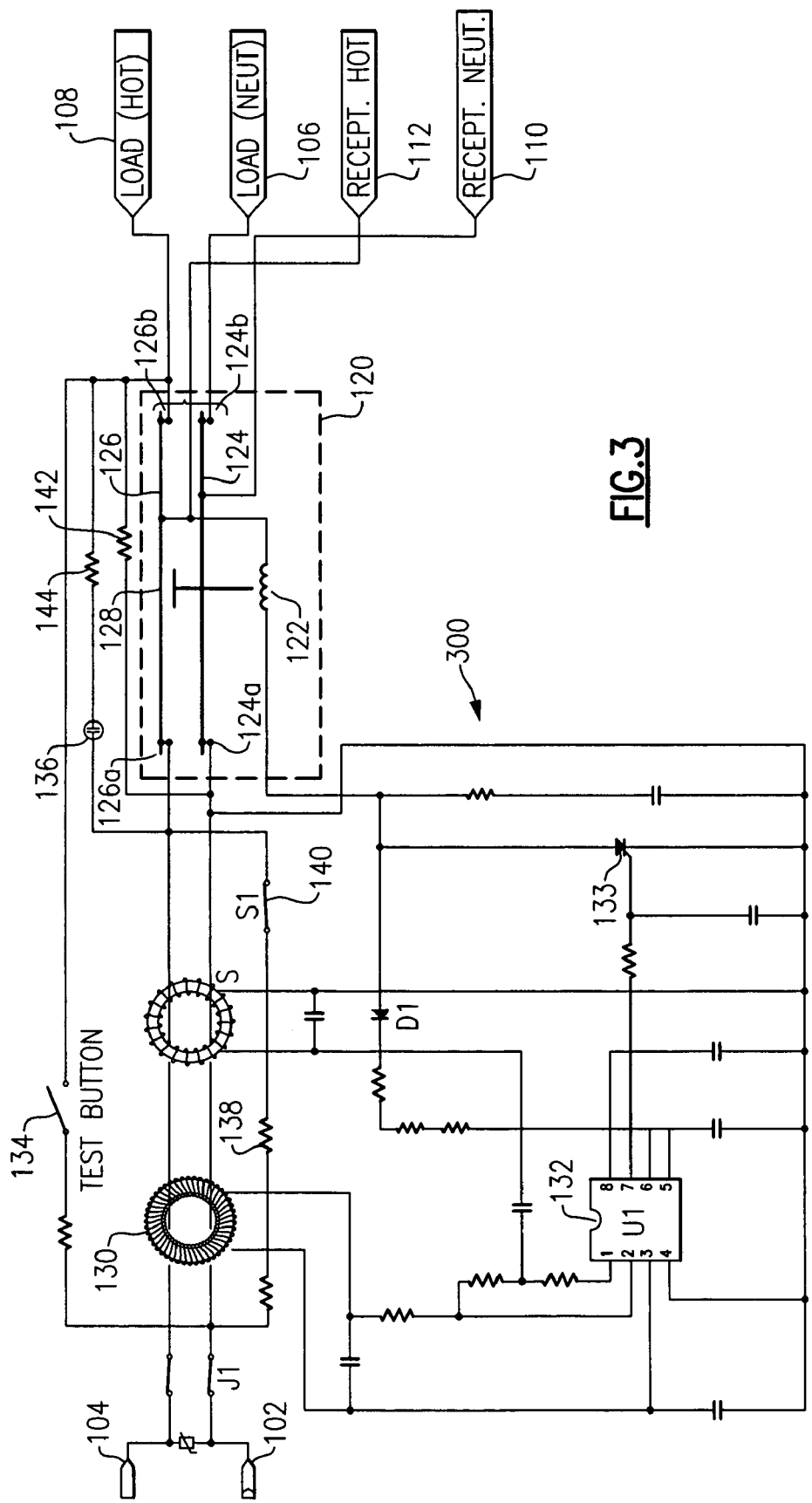
FIG. 3 is a schematic of a protective device in accordance with a third embodiment of the present invention.

Referring to FIG. 3, a third embodiment of the present invention is depicted. GFCI 300 provides an alternative lock-out arrangement. The protection device cannot be reset if the solenoid driver shorts out because breaker coil 122 is powered from the bus bar 126 of the circuit interrupter 120. When SCR 133 shorts out, breaker coil 122 is immediately actuated, causing circuit interrupter 120 to trip. Circuit interrupter 120 breaks the current to the bus bar and de-energizes breaker coil 122 to prevent it from burning out. If the device is reset, breaker coil 122 immediately trips out circuit interrupter 120 to prevent GFCI 300 from being reset. Again, resistor 146 is not needed in this embodiment because there is no need to indicate that the device has a faulty SCR 133. The inability to reset the device signals that condition.

Referring to FIG. 4, yet another embodiment of the present invention is shown. Protective device 400 may be applied to various protective devices such as ground fault circuit interrupters (GFCIs), arc fault circuit interrupters (AFCIs), or combination devices that provide both AFCI and GFCI protection. The present invention should not be construed as being limited to the examples listed above. Thus, protective circuit 402 may be configured to detect any number of fault conditions, including ground faults, arc faults, or both.

Circuit 402 signals SCR 404 when a fault is detected. SCR 404 energizes solenoid coil 406. In turn, interrupting contacts 408 are opened. Resistors 142, 144, 146, miswire resistance 138, normally closed switch 140, fuse 410, and light 136 are similar to, and have the same functionality as the circuits previously described. However, the miswire circuit in FIG. 4 operates in a different manner by directly signaling SCR 404. If device 400 is in the reset state and power is miswired to the load terminals, current flows through normally closed switch 140, fuse 410, miswire resistance 138 to cause SCR 404 to activate solenoid 406. In response, interrupting contacts 408 are opened (device 400 is tripped.) Fuse 410, if provided, and miswire resistance 138 are chosen to withstand the current flow for the time that power is applied to the load terminals to the moment when interrupting contacts 408 open, approximately 25 milliseconds. If line power is connected as intended to the line terminals of the protective device, current flows through normally closed switch 140, fuse 410, miswire resistance 138, and SCR 404 until such time as resistance 138 clears, or fuse 410 clears if provided. Afterwards, device 400 may be reset.

Solenoid 406 is designed not to burn out during the interval that SCR 404 is on. The interval is typically on the order of approximately 100 milliseconds. Accordingly, the miswire protective functionality described in the embodiment shown in FIG. 1 is provided without necessarily requiring a differential current transformer 130 to detect the miswired condition. Further, neither the miswire resistance nor the fuse circuit need be attached to both the hot and neutral line conductors. If an electronic switching device other than an SCR is used, e.g., a bipolar transistor, the connection to the gate of the SCR would instead be made to the base of the bipolar transistor. According to the embodiment of FIG. 4, the miswire detection signal does not necessarily have to be routed through the fault detection circuitry as is shown in the previous embodiments. In other words, the fault detection circuits in the previous embodiments considers the miswire detection signal as a fault condition signal. In the embodiment of FIG. 4, the miswire detection signal by-passes the fault detection circuit and is applied directly to SCR 404 to trip device 10. In another embodiment, the miswire detection signal is gated with the fault detection signal to create a Boolean output that is interpreted by detection circuitry.

Figure 5:
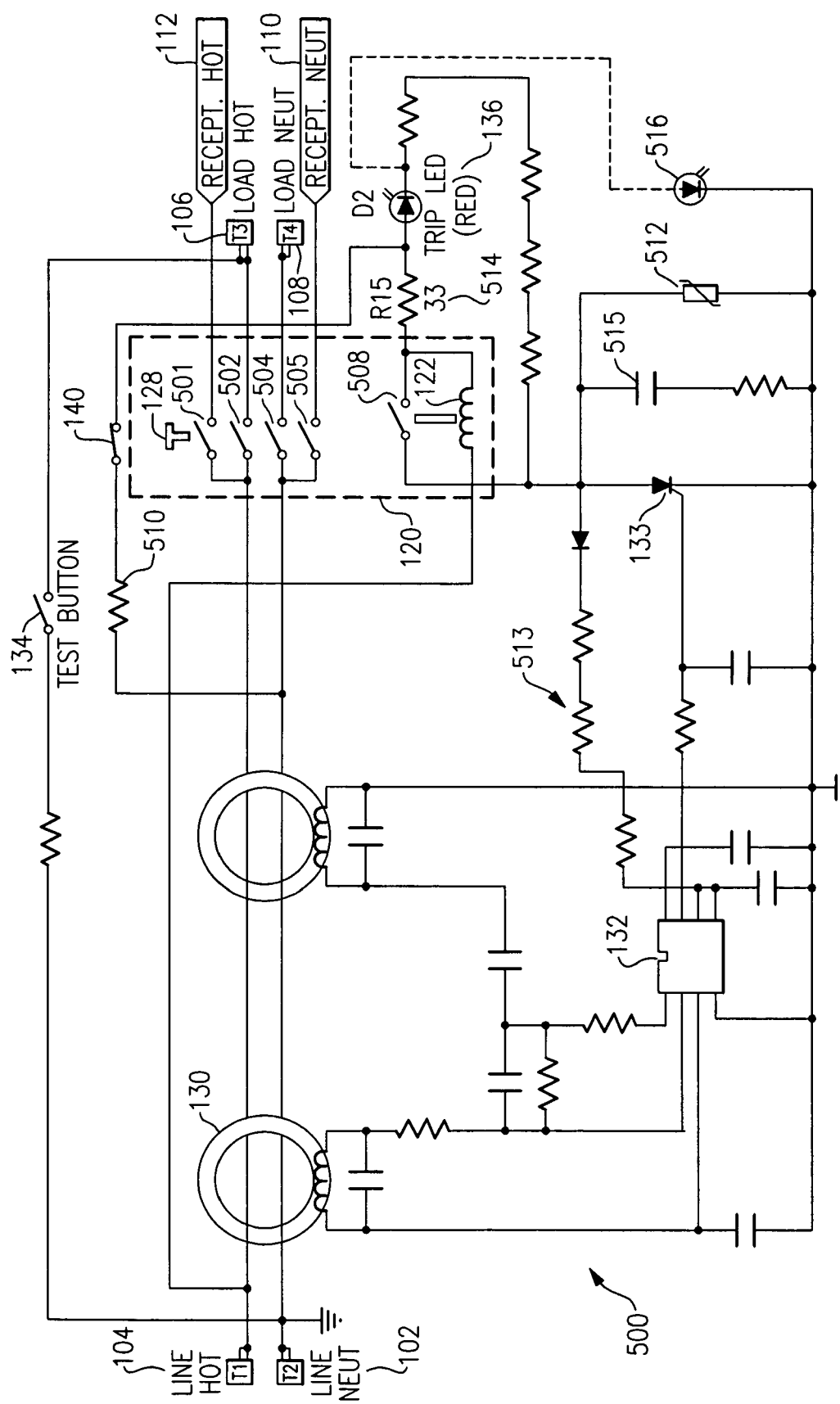
FIG. 5 is a schematic of a protective device in accordance with yet another embodiment of the present invention.

Referring to FIG. 5, yet another embodiment of the present invention is disclosed. While device 500 is shown as a GFCI for illustrative purposes, this embodiment is applicable to any type of protective device. For example, circuit interrupter 120 performs in a manner similar to what has been described, but includes cantilevers 501, 502, 504 and 505. The cantilevers are configured to connect the respective line terminals and load terminals together when circuit interrupter 120 is reset. When circuit interrupter 120 is tripped, the load terminals are disconnected from the line terminals and from each other. Circuit interrupter 120 also includes an auxiliary switch 508 that is open when circuit interrupter 120 is tripped, and closed when circuit interrupter 120 is reset. Solenoid 122 is disposed in series with auxiliary switch 508 and SCR 133. When SCR 133 shorts out, breaker coil 122 is immediately actuated, causing circuit interrupter 120 to trip. Circuit interrupter 120 opens the auxiliary switch 508 to de-energize breaker coil 122. Accordingly, coil 122 is prevented from burning out. Breaker coil 122 immediately trips circuit interrupter 120 if a device reset is attempted. Accordingly, reset cannot be maintained if SCR 133 shorts out, or if another component has reached an end of life condition that causes SCR 133 to permanently turn on.

When the device 500 is miswired, the miswire resistance 510 conducts an electrical current that causes the circuit interrupter to trip when reset is attempted. When the device has been properly wired, the miswire resistance "clears." The miswire resistance can be a resistor, fuse, or other electronic component that clears by melting or burning open. When the miswire resistance 510 "clears," there is typically little or no residual current through the miswire resistance 510, i.e., there is no leakage current. A leakage current may be interpreted by device 500 as a miswire condition that causes the device to trip out. Further, a leakage current may combine with the current from a true fault condition, resulting in failure to accurately detect the magnitude of the true fault condition. Clearing of the resistance 510 may be accomplished by using I²R heating to form a burn-spot on the surface of a resistor or to form an air gap. Even if the cleared condition is impervious to becoming conductive during normal operation of the device, high impulse voltages on the electrical power distribution system, such as from lightning, can result in surge currents passing through the burn spot or air gap, resulting in a leakage path.

One method for protecting a miswire resistance from a high impulse voltage is to connect a metal oxide varistor (MOV 148 in FIG. 1) across the line and/or load terminals to clamp the impulse voltage to a predetermined threshold at which the cleared resistance is capable of blocking a surge current. The MOV must be relatively large in size in order to clamp the impulse voltage, typically greater than 12 mm in diameter. However, a 12 mm MOV may be costly. Alternatively, an air gap can be located across the line or load terminals. Whereas an air gap is less costly than a MOV, the air gap does not always clamp the supply voltage reliably. Accordingly, a movistor and air gap combination may be employed. However, the last two alternatives may not be as effective as the first alternative.

The embodiment depicted in FIG. 5 provides another alternative. Miswire resistance 510 is disposed in series with breaker solenoid 122. Miswire resistance 510 is similar in operation to resistance 138. Accordingly, miswire resistance 510 is designed to clear when device 500 is properly wired. The duration of the clearing time and/or magnitude of the clearing current are chosen to avoid thermal damage to solenoid 122. Surge impulses typically have an amplitude of 1 to 6 kV. They are brief in duration and thus have frequency components typically greater than 100 kHz. The impedance of coil 122 is typically greater than 500 ohms at a frequency of 100 KHz. Accordingly, the frequency dependence of the coil impedance may be used to safeguard the device. If the cleared miswire resistance breaks over because of the impulse voltage, the impedance of the breaker coil serves to limit the surge current through the miswire resistance. The surge current may also be absorbed by capacitor 515 coupled in parallel with miswire resistance 510. In another embodiment, an inductor (not shown) may be disposed in series with miswire resistance 510. The inductor is configured to limit the surge current, or any high frequency current, through miswire resistance 510 in a manner similar to solenoid 122.

FIG. 5 also shows that MOV (or spark gap) 512 may be coupled in parallel with miswire resistance 510. MOV 512 may be downsized to take advantage of the frequency dependence of the coil impedance, which was described above. Accordingly, MOV 512 may have a diameter that is less than or equal to 7 mm, while still managing to clamp the voltage, because the solenoid impedance limits the amount of current through MOV 512. This approach may also prove to be less costly. The life expectancy of MOV 512 may be greatly increased by the series impedance of solenoid 122 because the surge currents through it are greatly attenuated. This arrangement is applicable to both single and multiple phase electrical power distribution systems. Considering a 120 VAC power distribution system, for example, MOV 512 may be selected to clamp in a range between 200 Volts to 500 Volts. The magnitude of the clamped voltage is insufficient for breaking over cleared resistance 510.

Alternatively, a MOV (or spark gap) 512 may be coupled in parallel with miswire resistance 510 to protect the cleared miswire resistance 510 from voltage surges. An auxiliary switch 508 may be disposed in series with solenoid 122 and SCR 133. The auxiliary switch 508 protects solenoid 122 from burn-out when SCR 133 has shorted out, or when SCR 133 is permanently on due to a component in device 500 having reached end of life.

Note that detector 132 receives power through power supply 513. As such, while MOV 512 protects the miswire resistance 510, it may also be configured to protect SCR 133 and/or power supply 513 from voltage surges. As noted previously, the cleared miswire resistance 510 may be protected from voltage surges by MOV 512 or by a MOV (or spark gap) 148 as has been described, in combination. While MOV 512 protects the miswire resistance from more frequent voltage pulses of comparatively lesser energy, the MOV (or spark gap) 148 is configured to protect the miswire resistance and the device in general from less frequent but comparatively greater voltage impulses having greater energy. MOV (or spark gap) 148 serves to reduce the energy from the voltage impulses absorbed by MOV 512, permitting a smaller MOV 512 to be employed.

The miswire resistance 510 may also be protected by a supplemental resistor 514. During the exposure of device 500 to an impulse voltage, resistor 514 limits the surge current through the cleared miswire resistance 510 in order to safeguard the cleared condition. Resistor 514 may be configured to remain intact and not clear when device 500 is properly wired. In one embodiment, miswire resistance 510 has a resistor value of 1,300 Ohms and resistor 514 has a value of 33 Ohms. Resistor 514 does not clear but serves to limit the surge current through cleared resistor 510. Resistor 514 may be included in the other embodiments of the invention shown herein.

The voltage impulse protection strategies described herein may be employed individually or in combination. Protection of the cleared miswire resistance from impulse voltages permits the miswire resistance 510 to be miniaturized. If miswire resistance 510 is embodied as a surface mount resistor, for example, resistor size can be reduced from a 0.25 inch to a 0.125 inch length, or even smaller. Miniaturization causes increased I²R heating during the clearing time interval. All other things being equal, the clearing time decreases. The value of resistance 510 may be increased to eliminate the increase in the time interval. Miniaturization and/or increased resistance value reduce audible noise emitted by the miswire resistor and, if provided, the series solenoid, during the clearing time interval.

Trip indicator light (or annunciator) 136 may be included in parallel with auxiliary switch 508, turning on when the circuit interrupter 120 is in the tripped condition, and turning off when the circuit interrupter 120 is in the reset condition. Indicator light 136 also demonstrates if auxiliary switch 508 has reached end-of-life and cannot open or close.

A pilot indicator 516 may also be included in series with the auxiliary switch 508, turning on when the circuit interrupter 120 is in the reset condition and turning off when the circuit interrupter 120 is in the tripped condition. In yet another alternative, device 500 may include both a trip indicator 136 and pilot indicator 516.

Figure 6:
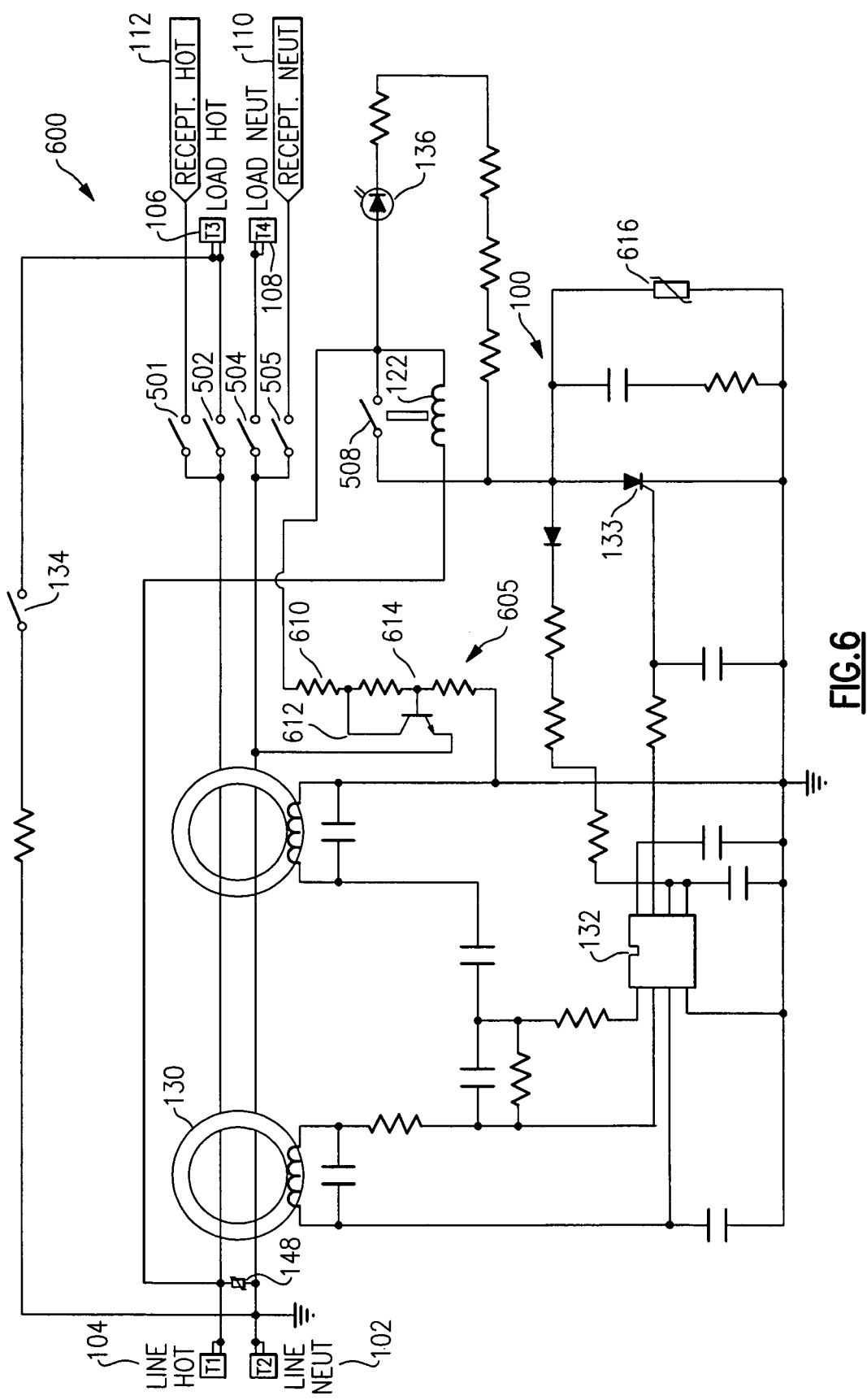
FIG. 6 is a schematic of a protective device in accordance with yet another embodiment of the present invention.

As embodied herein and depicted in FIG. 6, a schematic of a GFCI 600 in accordance with another embodiment is shown. The miswire circuit depicted in FIG. 6 may be used with the embodiments described above. Further, like elements are identified using the same reference numerals. Miswire circuit 605 includes a miswire resistance 610 in combination with transistor 612. Miswire resistance 610 is similar in operation to miswire resistance 138 as previously described. Miswire resistance 610 turns transistor 612 on when device 600 is miswired. The current through miswire circuit 605 causes device 600 to trip each time resetting is attempted. When device 600 is properly wired, miswire resistance 610 "clears", causing transistor 612 to turn off. Absence of current through the miswire circuit 605 allows device 600 to be reset. An impulse voltage from the power distribution system may result in cleared resistance 610 developing a conductive path. The conductance is not enough to turn transistor 612 on due to biasing circuit 614. Thus, even though a voltage impulse has damaged the cleared miswire resistance 610, the damage does not result in an unwanted leakage current through the miswire circuit. In addition, miswire circuit 605 may be protected from voltage surges by the impedance of solenoid 122, MOV 148, or MOV 616.

Figure 7:
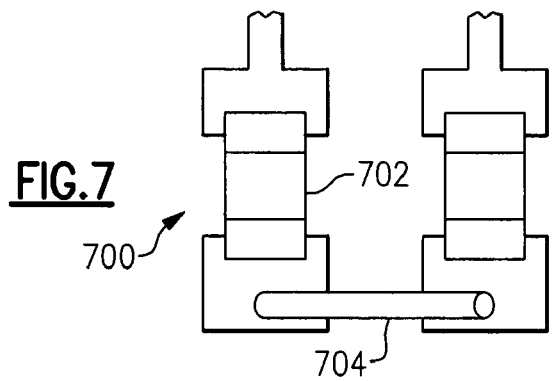
FIG. 7 is a plan view of a mechanical implementation of a miswire resistance.
Figure 8:
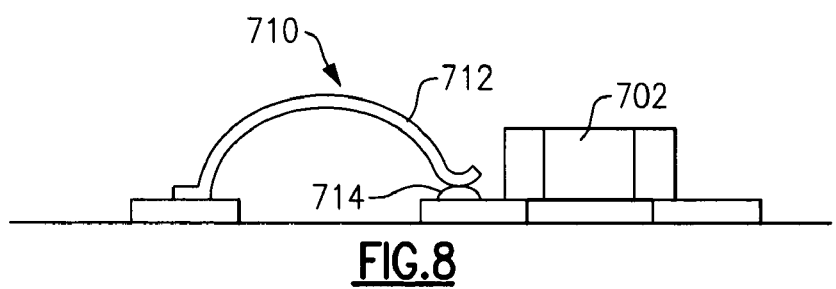
FIG. 8 is an elevation view of another mechanical implementation of a miswire resistance.
Figure 9:
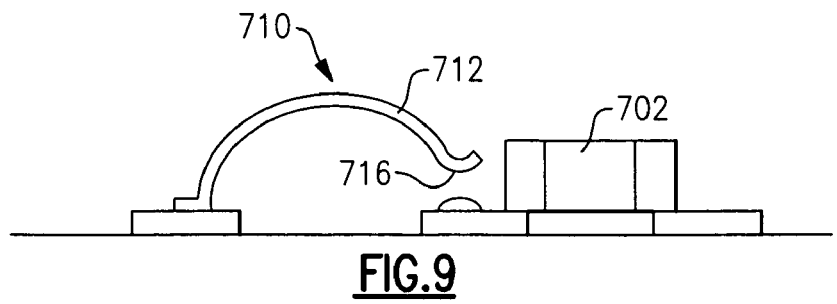
FIG. 9 is an elevation view of the mechanical implementation depicted in FIG. 8 in an open position.

Referring to FIGS. 7–9, mechanical implementations of the miswire resistance are shown. FIG. 7 is a plan view of a mechanical implementation of the miswire resistor that provides an air gap configured to block surge current resulting from an impulse voltage. Miswire resistance 700 includes at least one heating device such as resistor 702 in combination with wire 704 that has a predetermined melting point. When the device is properly wired, resistor 702 produces $I^2R$ heating above the pre-determined threshold, causing wire 704 to melt away and form an air gap. Wire 704 may be of any number of alloys familiar to those skilled in the art, including tin/lead alloys.

FIG. 8 is an elevation view of another mechanical implementation. Miswire resistance 710 includes at least one heating resistor 702 and a spring member 712 that is attached at or near resistor 702 using solder 714, or similarly conductive alloy. Spring member 712, solder 714, and miswire resistance 702 share electrical continuity, and therefore, are in a conductive state. When the protection device is properly wired, the solder attachment 714 fails in the manner previously described.

FIG. 9 is an elevation view of the mechanical implementation depicted in FIG. 8 in an open position. In FIG. 9, spring 712 has opened to a pre-biased position to form an air gap 716.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An electrical wiring protection device comprising:
    a housing assembly including a plurality of line terminals and a plurality of load terminals;
    a miswire detection circuit coupled to at least one of the plurality of line terminals, the miswire detection circuit being configured to generate a miswire detection signal when AC power is coupled to the plurality of load terminals, the miswire detection circuit including a circuit element configured to open circuit after a predetermined period of time elapses when AC power is coupled to the hot line terminal and neutral line terminal;
    a fault detection circuit coupled to at least one of the plurality of line terminals and configured to generate a fault detection signal in response to detecting at least one fault condition and/or the miswire detection signal;
    an interrupting contact assembly coupled between the plurality of line terminals and the plurality of load terminals, the interrupting contact assembly including interrupting contacts that provide electrical continuity between the plurality of line terminals and the plurality of load terminals in a reset condition, the interrupting contact assembly also being configured to open the interrupting contacts in a tripped condition, in response to the fault detection signal and/or the miswire detection signal; and
    a surge protection circuit coupled to the miswire detection circuit, the surge protection circuit being configured to prevent a current from traversing the open circuit.

2. The device of claim 1, wherein the interrupting contact assembly includes a switching element coupled to the interrupting contacts, the miswire detection signal turning the switching element ON to thereby open the interrupting contacts.

3. The device of claim 1, wherein the plurality of load terminals includes at least one receptacle terminal and at least one feed-through terminal.

4. The device of claim 3, wherein the at least one receptacle terminal and the at least one feed-through terminal are decoupled when the interrupting contact assembly is in the tripped condition.

5. The device of claim 3, further comprising an air gap that decouples the at least one receptacle terminal from the at least one feed-through terminal when there is a miswire detection signal.

6. The device of claim 1, wherein the circuit element includes a resistor.

7. The device of claim 1, wherein the circuit element includes a fuse.

8. The device of claim 1, wherein the circuit element comprises:
    at least one heating device; and
    a wire coupled to the at least one heating device, the wire having a predetermined melting point such that the wire melts to form an air gap after the predetermined period of time elapses.

9. The device of claim 8, wherein the wire is a tin-lead alloy.

10. The device of claim 8, wherein the at least one heating device includes a resistor.

11. The device of claim 1, wherein the circuit element comprises:
   at least one heating device; and
   a spring member coupled to the at least one heating device by a conductive element, the spring member being pre-biased to an open circuit position, the conductive element having a predetermined melting point such that the conductive element melts after the predetermined period of time elapses, whereby the spring member is directed into the open circuit position.

12. The device of claim 1 wherein the miswire detection circuit includes a switch disposed in the open position during manufacturing.

13. The device of claim 1, wherein the interrupting contact assembly further comprises:
   a switching element coupled to the fault detection circuit, the switching element being turned ON in response to the fault detection signal; and
   a breaker coil coupled between the switching element and the interrupting contacts, the breaker coil being configured to trip the interrupting contacts when the switching element is in the ON state.

14. The device of claim 13, further comprising an indicator circuit coupled to the switching element, the indicator circuit being energized when there is an end of life condition in the switching element.

15. The device of claim 14, wherein the indicator circuit is energized when there is an end of life condition in the fault detection circuit.

16. The device of claim 14, wherein the indicator circuit is energized to provide a trip condition indication.

17. The device of claim 14, wherein the indicator circuit is energized in combination with a resettable interrupting contact assembly to provide a miswire indicator, the miswire detection circuit generating the at least one fault condition immediately after resetting the interrupting contacts in the repeated trip state.

18. The device of claim 1, further comprising an indicator circuit coupled to the interrupting contact assembly, the indicator circuit being energized when the interrupting contacts are open to provide a tripped condition indication.

19. The device of claim 18, wherein the indicator assembly does not energize when AC power is miswired to the load terminals and the interrupting contacts are open to provide a miswired condition indication.

20. The device of claim 1, wherein the miswire detection circuit is coupled between the plurality of line terminals.

21. The device of claim 1, wherein the miswire detection circuit is coupled between a neutral one of the plurality of line terminals and a hot one of the plurality of line terminals.

22. The device of claim 1, wherein the interrupting contact assembly includes a bus bar.

23. The device of claim 1, wherein the interrupting contact assembly includes a cantilever beam.

24. The device of claim 1, wherein the at least one fault condition generates a differential current.

25. The device of claim 1, wherein the at least one fault condition includes a ground fault condition, an open neutral fault condition, and/or an arc fault condition.

26. The device of claim 1, wherein the surge suppression circuit includes a metal oxide varistor (MOV) connected between a hot line terminal and a neutral line terminal.

27. The device of claim 1, wherein the surge suppression circuit includes a metal oxide varistor (MOV) connected between a hot load terminal and a neutral load terminal.

28. The device of claim 1, wherein the miswire detection circuit includes a resistor in series with an inductor.

29. The device of claim 28, wherein the inductor includes a breaker solenoid disposed in the interrupting contact assembly.

30. The device of claim 29, wherein the resistor includes the circuit element in series with a surge suppression resistor.

31. The device of claim 29, wherein the breaker solenoid is configured to limit the surge current through the resistor.

32. The device of claim 31, wherein the breaker coil has an impedance that is proportional to a frequency of the surge current.

33. The device of claim 32, wherein the breaker coil has an impedance of approximately 500 Ohms at approximately 100 KHz.

34. The device of claim 29, wherein the surge suppression circuit includes a surge suppression device disposed in parallel with the resistor.

35. The device of claim 34, wherein the surge suppression device includes a MOV.

36. The device of claim 35, wherein the MOV is selected to clamp any surge voltage within a range between 200 Volts to 500 Volts.

37. The device of claim 36, wherein the surge suppression device includes a spark gap.

38. The device of claim 1, further comprising an auxiliary switch coupled to the breaker coil and a silicon controlled rectifier (SCR) disposed in the interrupting contact assembly.

39. The device of claim 38, wherein the auxiliary switch is responsive to an end-of-life condition.

40. The device of claim 38, further comprising a trip indicator coupled to the auxiliary switch.

41. The device of claim 40, wherein the trip indicator is ON to indicate a tripped condition.

42. The device of claim 40, wherein the trip indicator is OFF when the interrupting contacts are in the reset condition.

43. The device of claim 40, wherein the trip indicator is ON when the auxiliary switch has reached end-of-life.

44. The device of claim 40, wherein the trip indicator includes a light.

45. The device of claim 40, wherein the trip indicator includes an annunciator.

46. The device of claim 40, further comprising a pilot light coupled to the auxiliary switch.

47. The device of claim 1, wherein the circuit element includes a resistor configured to open circuit after the predetermined period of time elapses.

48. The device of claim 1, wherein the surge suppression circuit includes a surge suppression device disposed in parallel with the miswire detection circuit.

49. The device of claim 48, wherein the surge suppression device is disposed in parallel with a miswire resistor.

50. The device of claim 49, wherein the surge suppression device is a MOV.

51. The device of claim 49, wherein the surge suppression device is a spark gap.

52. The device of claim 49, further comprising a capacitor disposed in parallel with the surge suppression device.

53. The device of claim 1, wherein the miswire detection circuit includes a resistor coupled to a transistor.

54. The device of claim 53, wherein the resistor turns the transistor ON when the device is miswired to generate the miswire detection signal.

55. The device of claim 53, wherein the resistor clears to generate the open circuit after the predetermined period of time elapses.

56. The device of claim 55, wherein the transistor is turned OFF when the resistor clears.

57. The device of claim 1, wherein the surge protection circuit includes a resistor disposed in series with the circuit element configured to prevent a current from traversing the open circuit.

58. A method for protecting against miswiring a protection device, the protection device including a plurality of line terminals and a plurality of load terminals, the protection device also including interrupting contacts that provide electrical continuity between the plurality of line terminals and the plurality of load terminals in a reset state and decouple the plurality of line terminals from the plurality of load terminals in a tripped state, the method comprising:
  (a) resetting the interrupting contacts when the device is improperly connected to a source of AC power;
  (b) immediately tripping the interrupting contacts in response to being improperly connected to the source of AC power; and
  (c) repeating step (a) and step (b) until the device is properly connected to a source of AC power.

59. The method of claim 58, further comprising:
  tripping the interrupting contacts when the device is properly connected to the source of AC power;
  clearing a circuit element after a predetermined time period; and
  resetting the interrupting contacts.

60. The method of claim 59, further comprising the step of preventing damage to the cleared circuit element from surge current when the device is properly connected to the source of AC power.

* * * * *

UNITED STATES PATENT AND TRADEMARK OFFICE
CERTIFICATE OF CORRECTION

PATENT NO. : 7,239,491 B1
APPLICATION NO. : 10/964217
DATED : July 3, 2007
INVENTOR(S) : Morgan et al.

It is certified that error appears in the above-identified patent and that said Letters Patent is hereby corrected as shown below:

On the title page replace the Assignee with the following
(73) Assignee: Pass & Seymour, Inc., Syracuse, NY (US)

On the title page replace the Attorney, Agent, or Firm with the following
(74) Attorney, Agent, or Firm - Daniel P. Malley; Bond, Schoeneck & King PLLC Signed and Sealed this Fourth Day of September, 2007

JON W. DUDAS
*Director of the United States Patent and Trademark Office*